US012597817B2

(12) United States Patent　　(10) Patent No.: US 12,597,817 B2
Kitahara et al.　　(45) Date of Patent: Apr. 7, 2026

(54) ROTOR AND METHOD FOR MANUFACTURING ROTOR

(71) Applicant: TOYOTA BOSHOKU KABUSHIKI KAISHA, Aichi-ken (JP)

(72) Inventors: Makoto Kitahara, Toyota (JP); Masaki Sugiyama, Okazaki (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 229 days.

(21) Appl. No.: 18/642,055

(22) Filed: Apr. 22, 2024

(65) Prior Publication Data

US 2024/0364158 A1　　Oct. 31, 2024

(30) Foreign Application Priority Data

Apr. 25, 2023　(JP) ................................. 2023-071632

(51) Int. Cl.
　　*H02K 1/28*　　　(2006.01)
　　*B29C 45/00*　　(2006.01)
　　　　(Continued)

(52) U.S. Cl.
　　CPC ........... *H02K 1/28* (2013.01); *B29C 45/0025* (2013.01); *B29C 45/14311* (2013.01);
　　　　(Continued)

(58) Field of Classification Search
　　CPC .......... H02K 1/28; H02K 1/27; H02K 1/2773; H02K 1/278; H02K 1/2786; H02K 1/30; H02K 1/2706; H02K 1/02; H02K 1/16;

H02K 1/24; H02K 1/2713; H02K 1/32; H02K 15/00; H02K 15/03; H02K 15/12; H02K 15/02; H02K 2213/03; H02K 9/06; H02K 11/215; H02K 11/0068; H02K 11/022; H02K 11/40; H02K 29/08; H02K 29/00; H02K 29/14
See application file for complete search history.

(56) References Cited

U.S. PATENT DOCUMENTS 7,122,934 B2 * 10/2006 Yamamoto .............. B29C 70/72
　　　　　　　　　　　　　　　　　310/43
7,479,723 B2 * 1/2009 Dawsey ............... H02K 1/2766
　　　　　　　　　　　　　　　　　310/91

(Continued)

FOREIGN PATENT DOCUMENTS

DE　　102016210417 A1 * 12/2016　............... H02K 1/28
EP　　　　3961870 A1 * 3/2022　............. F24F 7/007

(Continued)

*Primary Examiner* — Maged M Almawri

(74) *Attorney, Agent, or Firm* — Greenblum & Bernstein, P.L.C.

(57) ABSTRACT

A rotor includes a rotor core including multiple housing holes, multiple magnets accommodated in the housing holes, and multiple plastic portions. Each plastic portion is formed by plastic that fills corresponding one of the housing holes and fixes the corresponding magnet to the rotor core. Each plastic portion includes an end face exposed from an opening of the corresponding housing hole. A gate mark is formed in the end face. A quotient obtained by dividing an area of the end face of each plastic portion by an area of the gate mark is in a range of 24 to 150.

5 Claims, 5 Drawing Sheets

(51) Int. Cl.

| | |
|---|---|
| *B29C 45/14* | (2006.01) |
| *H02K 1/274* | (2022.01) |
| *H02K 15/03* | (2006.01) |
| *H02K 15/12* | (2006.01) |
| B29K 105/00 | (2006.01) |
| B29K 105/16 | (2006.01) |
| B29K 105/20 | (2006.01) |
| B29L 31/00 | (2006.01) |

(52) U.S. Cl.
CPC .. *B29C 45/14467* (2013.01); *B29C 45/14639* (2013.01); *H02K 1/274* (2013.01); *H02K 15/03* (2013.01); *H02K 15/12* (2013.01); *B29C 2045/0027* (2013.01); *B29C 2045/14327* (2013.01); *B29K 2105/0079* (2013.01); *B29K 2105/16* (2013.01); *B29K 2105/203* (2013.01); *B29L 2031/7498* (2013.01)

(56) References Cited

U.S. PATENT DOCUMENTS

| | | | | |
|---|---|---|---|---|
| 7,897,089 | B2 * | 3/2011 | Matsubayashi ... | B29C 45/14008 264/263 |
| 10,116,193 | B2 * | 10/2018 | Yamaguchi .......... | H02K 1/2766 |
| 10,532,501 | B2 * | 1/2020 | Okudaira .......... | B29C 45/14344 |
| 10,903,702 | B2 * | 1/2021 | Lee ........................ | H02K 15/12 |
| 11,277,059 | B2 * | 3/2022 | Kimura .................... | H02K 1/28 |
| 12,078,188 | B2 * | 9/2024 | Katsuki .................. | H02K 11/33 |
| 2011/0109189 | A1 * | 5/2011 | Taema ................. | H02K 15/095 310/215 |
| 2013/0313948 | A1 * | 11/2013 | Zucker .................... | H02K 7/14 310/68 D |
| 2014/0042834 | A1 * | 2/2014 | Asahi .................... | H02K 1/276 310/43 |
| 2018/0062488 | A1 | 3/2018 | Okudaira et al. | |
| 2018/0102698 | A1 * | 4/2018 | Iwamoto ............... | H02K 15/12 |
| 2020/0127508 | A1 * | 4/2020 | Dlala ..................... | H02K 1/276 |
| 2021/0376707 | A1 * | 12/2021 | McDonald ............. | B65G 23/23 |
| 2022/0166279 | A1 * | 5/2022 | Shimokawa ........... | H02K 3/325 |
| 2022/0247289 | A1 * | 8/2022 | Yoshisako ............. | H02K 15/03 |
| 2022/0416598 | A1 * | 12/2022 | Inuzuka ............... | H02K 3/522 |
| 2022/0416608 | A1 * | 12/2022 | Ichioka .................. | H02K 3/522 |
| 2023/0006516 | A1 * | 1/2023 | Inuzuka .................. | H02K 3/12 |
| 2023/0010726 | A1 * | 1/2023 | Inuzuka .................. | H02K 7/14 |
| 2023/0039041 | A1 * | 2/2023 | Katsuki .................. | H02K 11/30 |
| 2023/0208235 | A1 * | 6/2023 | Ogawa .................. | H02K 15/12 310/215 |
| 2024/0364193 | A1 * | 10/2024 | Kitahara ............... | H02K 15/12 |

FOREIGN PATENT DOCUMENTS

| | | | | |
|---|---|---|---|---|
| JP | 2015100157 A | * | 5/2015 | |
| WO | 2016/147211 | | 9/2016 | |
| WO | WO-2022225392 A1 | * | 10/2022 | ............. H02K 15/12 |

* cited by examiner

ROTOR AND METHOD FOR MANUFACTURING ROTOR

BACKGROUND

1. Field

The present disclosure relates to a rotor and a method for manufacturing a rotor.

2. Description of Related Art

As a type of rotor of this kind, for example, International Publication No. 2016/147211 discloses a magnet-embedded rotor. The magnet-embedded rotor includes a rotor core, which has multiple housing holes, permanent magnets (hereinafter, referred to as magnets) accommodated in the housing holes, and a thermoplastic (hereinafter referred to as plastic) that fills the housing holes and fixes the magnets to the rotor core.

In the above-described publication, the housing holes are filled with the plastic in a molten state with the rotor core held between an upper die and a lower die and the magnets accommodated in the housing holes. The lower die includes a gate passage through which plastic in a molten state injected from a nozzle of an injection molding machine is introduced into the housing holes.

In such a method for manufacturing a rotor, the cross-sectional area of the gate passage is set to be relatively large to increase the flowability of plastic in the gate passage. However, an increase in the cross-sectional area of the gate passage increases the outer diameter of a plastic gate portion, which is formed by the hardening of the plastic present in the gate passage. Therefore, it is necessary to provide a step for cutting the plastic gate portion with a cutter.

Furthermore, such issues may not only occur when filling the housing holes with thermoplastic, but also arise similarly when filling the housing holes with thermosetting plastic.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a rotor includes a rotor core including multiple housing holes, multiple magnets accommodated in the housing holes, and multiple plastic portions. Each plastic portion is formed by plastic that fills corresponding one of the housing holes and fixes the corresponding magnet to the rotor core. Each plastic portion includes an end face exposed from an opening of the corresponding housing hole. A gate mark is formed on the end face of each plastic portion. The gate mark is a trace created when a plastic gate portion formed in a gate passage of a plastic filling device is separated during a process of filling the housing hole with the plastic through the gate passage. A quotient obtained by dividing an area of the end face of each plastic portion by an area of the gate mark is in a range of 24 to 150.

In another general aspect, a method for manufacturing a rotor is provided. The rotor includes a rotor core including multiple housing holes, multiple magnets accommodated in the housing holes, and multiple plastic portions. Each plastic portion is formed by plastic that fills corresponding one of the housing holes and fixes the corresponding magnet to the rotor core. The method for manufacturing the rotor includes: filling each housing hole with the plastic through a gate passage of a plastic filling device and openings of the housing holes, the plastic filling device being arranged adjacent to an end face of the rotor core; and setting an area of each opening and a cross-sectional area of the gate passage such that a quotient obtained by dividing the area of the opening by the cross-sectional area of the gate passage is in a range of 24 to 150.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A rotor and a method for manufacturing a rotor according to embodiments will now be described with reference to FIGS. 1 to 10.

First Embodiment

A rotor 10 according to a first embodiment will now be described.

Figure 1:
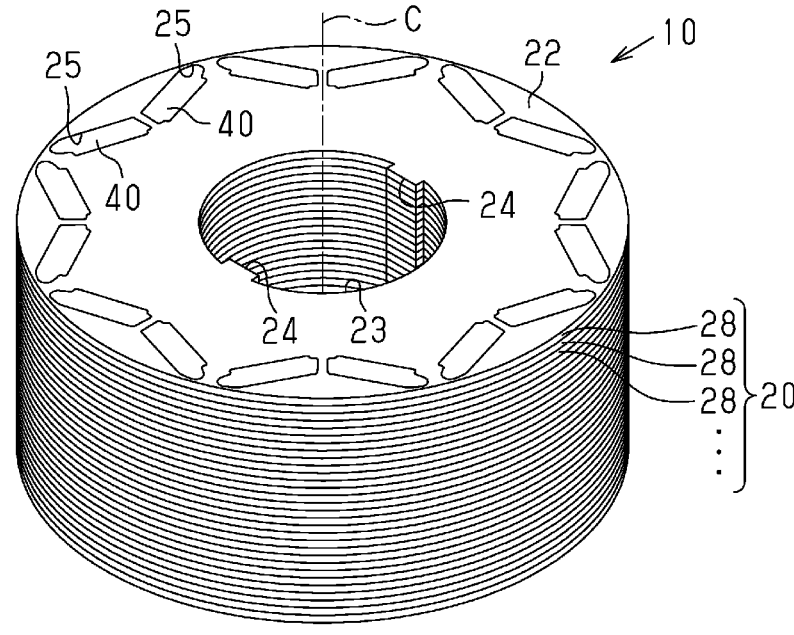
FIG. 1 is a perspective view of a rotor according to embodiments.
Figure 2:
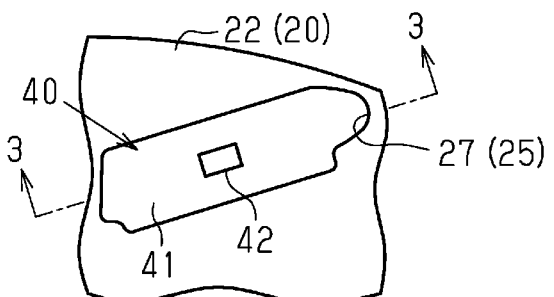
FIG. 2 is an enlarged plan view mainly showing an end face of a plastic portion exposed from a housing hole in a rotor according to a first embodiment.
Figure 3:
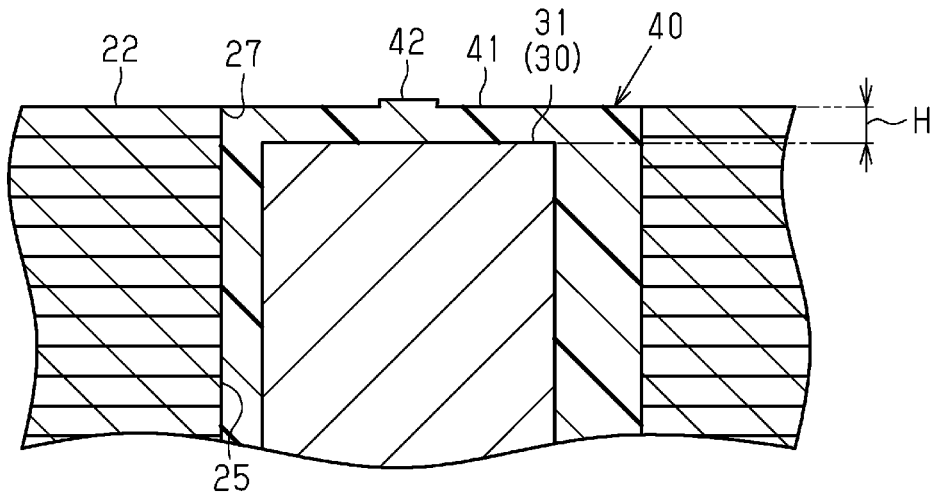
FIG. 3 is a cross-sectional view taken along line 3-3 of FIG. 2.

As shown in FIGS. 1 to 3, the rotor 10 includes a rotor core 20, which includes multiple housing holes 25, multiple magnets 30, which are accommodated in the housing holes 25, and multiple plastic portions 40. The plastic portions 40 are made of plastic that fills the housing holes 25 to fix the magnets 30 to the rotor core 20. In FIGS. 1 and 2, the magnets 30 are covered by the plastic portions 40 and are thus not exposed to the outside.

The rotor core 20 is substantially shaped as a cylinder having an axis C. The rotor core 20 is formed by a laminated body in which core pieces 28 made of magnetic steel sheets are stacked.

In the following description, the axial direction of the rotor core 20 will simply be referred to as an axial direction, radial directions of the rotor core 20 will simply be referred to as radial directions, and a circumferential direction of the rotor core 20 will simply be referred to as a circumferential direction.

Figure 4:
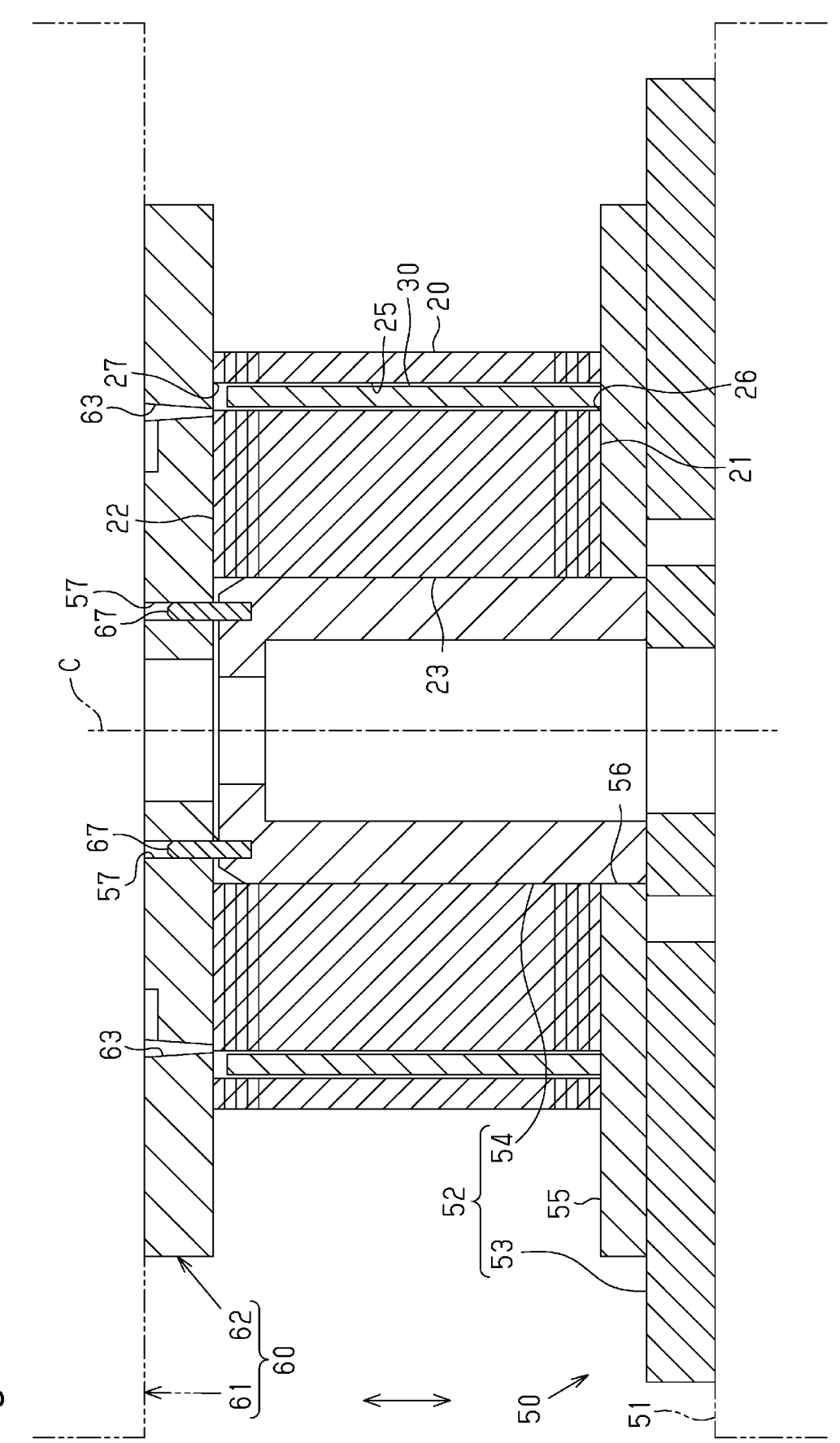
FIG. 4 is a cross-sectional view illustrating a plastic filling device according to the embodiments.

The rotor core 20 includes a first end face 21 and a second end face 22, which is located on the side opposite to the first end face 21 (refer to FIG. 4).

The rotor core 20 includes a center hole 23, which extends through the rotor core 20 in the axial direction. Two key portions 24 project radially inward from the inner circumferential surface of the center hole 23 to be opposed to each other in a radial direction.

The housing holes 25 are arranged at intervals in the circumferential direction. The housing holes 25 extend through the rotor core 20 in the axial direction. Each housing hole 25 includes a first opening 26, which opens in the first end face 21, and a second opening 27, which opens in the second end face 22 (refer to FIG. 4). The second opening 27 (the first opening 26) is elongate.

Each magnet 30 is a permanent magnet and has a substantially rectangular parallelepiped shape extending in the axial direction. In the embodiments, each housing hole 25 accommodates one of the magnets 30. Each housing hole 25 may accommodate two or more magnets 30.

The plastic portions 40 are made of thermoplastic. The plastic of the plastic portions 40 includes a base plastic made of a liquid-crystal polymer base plastic, and a filler. The filler includes, for example, glass fibers and known inorganic filler. The addition amount of the filler is preferably in the range of 2 wt % to 40 wt %. The addition amount of the filler is 30 wt % in the embodiments.

Each plastic portion 40 includes an end face 41, which is exposed from the second opening 27 of the corresponding housing hole 25. A gate mark 42 is formed in the end face 41. The gate mark 42 is a trace created when a plastic gate portion formed in a gate passage 63 is separated during the process of filling the housing hole 25 with the plastic of the plastic portion 40 through the gate passage 63 of a second die 60, which will be discussed below.

A single gate mark 42 is formed at a center portion in a lengthwise direction of the second opening 27 in the end face 41. The gate mark 42 is located at a position in the end face 41 where the gate mark 42 overlaps with the end face 31 of the magnet 30 when viewed in the axial direction. The gate mark 42 is rectangular in plan view. The "rectangular" shape in the present disclosure is not limited to a quadrangle having identical four corners, but includes a quadrangle having chamfered corners.

A quotient S1/S2 obtained by dividing an area S1 of the end face 41 by an area S2 of the gate mark 42 is in a range of 24 to 150. The quotient S1/S2 is preferably in a range of 40 to 100. The area S1 of the end face 41 is the area of a portion surrounded by the peripheral edge of the end face 41, that is, the area of a portion surrounded by the peripheral edge of the second opening 27. The area S2 of the gate mark 42 is the area of a portion surrounded by the peripheral edge of the gate mark 42.

As shown in FIG. 3, a distance H in the axial direction between the second end face 22 and the end face 31 of the magnet 30 is greater than or equal to 0.28 mm. When the end face 31 is inclined with respect to the second end face 22, the shortest distance between the second end face 22 and the end face 31 is the distance H.

Second Embodiment

A rotor 10 according to a second embodiment will now be described.

The rotor 10 according to the second embodiment is different from the rotor 10 according to the first embodiment in the following two points.

Figure 7:
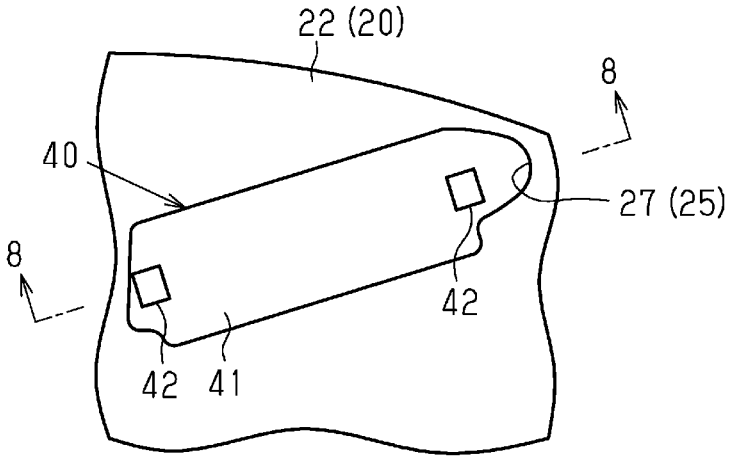
FIG. 7 is an enlarged plan view mainly showing an end face of a plastic portion exposed from a housing hole in a rotor according to a second embodiment.
Figure 8:
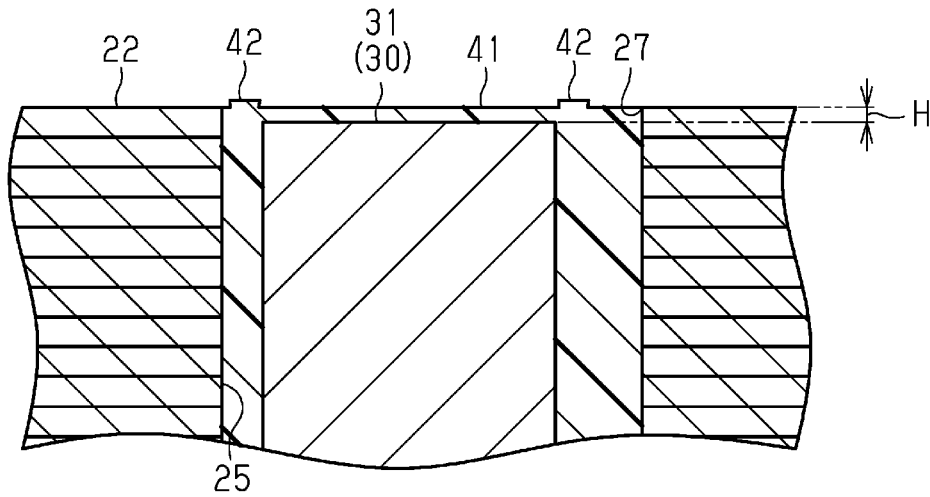
FIG. 8 is a cross-sectional view taken along line 8-8 of FIG. 7.

As shown in FIGS. 7 and 8, the distance H in the axial direction between the second end face 22 and the magnet 30 is less than 0.28 mm.

One gate mark 42 is formed at each of the opposite ends in the lengthwise direction of the second opening 27 in the end face 41 of the plastic portion 40. Each gate mark 42 is located at a position in the end face 41 where the gate mark 42 is separated from the end face 31 of the magnet 30 when viewed in the axial direction. Each gate mark 42 is rectangular in plan view.

The quotient S1/S2 obtained by dividing the area S1 of the end face 41 by the area S2 of the gate marks 42 is in a range of 24 to 150. The quotient S1/S2 is preferably in a range of 40 to 100. In this case, the area S2 of the gate marks 42 is the sum of the areas of the two gate marks 42.

Plastic Filling Device

Next, a plastic filling device for filling the housing holes 25 with the plastic of the plastic portions 40 will be described.

As shown in FIG. 4, the plastic filling device includes a first die 50 and a second die 60.

First Die 50

The first die 50 includes a first die body 51, a conveying plate 52, which is disposed on the upper surface of the first die body 51, and a spacer 55, which is disposed on the upper surface of the conveying plate 52.

The conveying plate 52 is configured to convey the rotor core 20 from outside the plastic filling device onto the first die body 51. The conveying plate 52 includes a plate portion 53 and a cylindrical post portion 54, which protrudes upward from a center portion of the upper surface of the plate portion 53 and is inserted into the center hole 23 of the rotor core 20.

The post portion 54 includes two keyways (not shown), which extend in the axial direction of the post portion 54, on the outer circumferential surface. The key portions 24 of the rotor core 20 are respectively inserted into the keyways. The position in the circumferential direction of the rotor core 20 with respect to the plate portion 53 is determined by inserting the key portions 24 of the rotor core 20 into the keyways of the post portion 54.

Engaging pins 57 projecting upward are provided at the upper end of the post portion 54. The engaging pins 57 are spaced apart from each other in the circumferential direction.

The spacer 55 has a through-hole 56, through which the post portion 54 is inserted. Two restricting projections (not shown) are provided on the inner circumferential surface of the through-hole 56. The restricting projections are inserted into the two keyways of the post portion 54 to determine the position in the circumferential direction of the spacer 55 with respect to the plate portion 53.

The first end face 21 of the rotor core 20 contacts the upper surface of the spacer 55 to close first openings 26 of the housing holes 25.

Second Die 60

The second die 60 is disposed adjacent to the second end face 22 of the rotor core 20. The second die 60 includes a second die body 61 and a runner plate 62, which is fixed to the lower surface of the second die body 61. The second die 60 is configured to be lifted and lowered by a lift mechanism (not shown).

The second die body 61 includes a plastic passage (not shown) located on the axis C of the rotor core 20.

The runner plate 62 includes engaging holes 67, with which the engaging pins 57 of the post 54 are engaged.

The lower surface of the runner plate 62 is brought into contact with the second end face 22 of the rotor core 20. The runner plate 62 includes gate passages 63, which introduce plastic of the plastic portions 40 to the second openings 27 of the housing holes 25. The gate passages 63 are connected to the plastic passage through runner passages (not shown).

The method for manufacturing the rotor 10 will now be described.

As shown in FIG. 4, the rotor core 20 is disposed on the upper surface of the spacer 55 of the first die 50, a magnet 30 is accommodated in each housing hole 25, and the runner plate 62 is disposed on the second end face 22 of the rotor core 20. In this state, molten plastic for forming the plastic portions 40 is injected into the housing holes 25 through the gate passages 63 and the second openings 27 of the housing holes 25 (filling step).

Subsequently, the injected plastic is cooled to harden so as to form the plastic portions 40.

Thereafter, the second die 60 is lifted to separate plastic gate portions formed in the gate passages 63 from the rotor 10.

In the embodiments, an area S1' of the second opening 27 and a cross-sectional area S2' of the gate passage(s) 63 are set as follows in order to improve both the fillability of the plastic of the plastic portions 40 into the housing holes 25 and the separability of the plastic gate portions.

Figure 5:
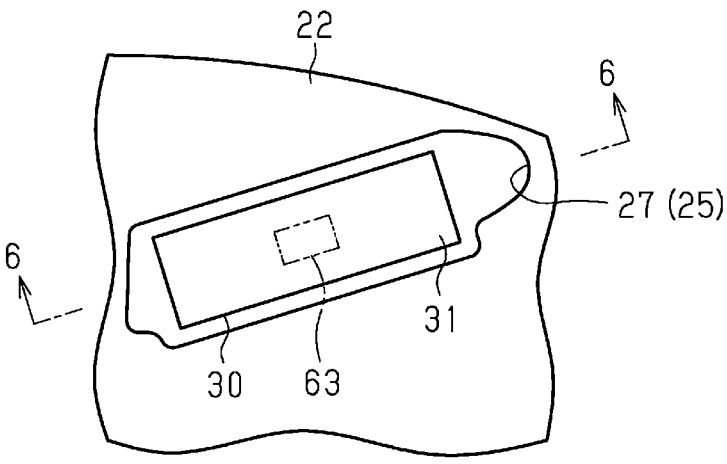
FIG. 5 is an enlarged plan view of a rotor core according to the first embodiment, mainly showing a housing hole accommodating a magnet.
Figure 9:
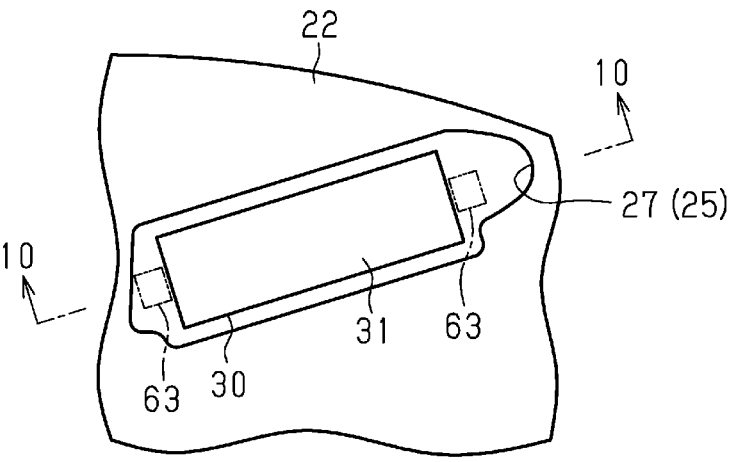
FIG. 9 is an enlarged plan view of a rotor core according to the second embodiment, mainly showing a housing hole accommodating a magnet.

As shown in FIGS. 5 and 9, the area S1' of the second opening 27 and the cross-sectional area S2' of the gate passage 63 are set such that the quotient S1'/S2', obtained by dividing the area S1' of each second opening 27 by the cross-sectional area S2', of the gate passage(s) 63 is in the range of 24 to 150. The area S1' of the second opening 27 is equal to the area S1 of the end face 41.

When each housing hole 25 is filled with the plastic of the plastic portion 40 through multiple gate passages 63, the cross-sectional area S2' of the gate passages 63 is the sum of the cross-sectional areas of the multiple gate passages 63.

Figure 10:
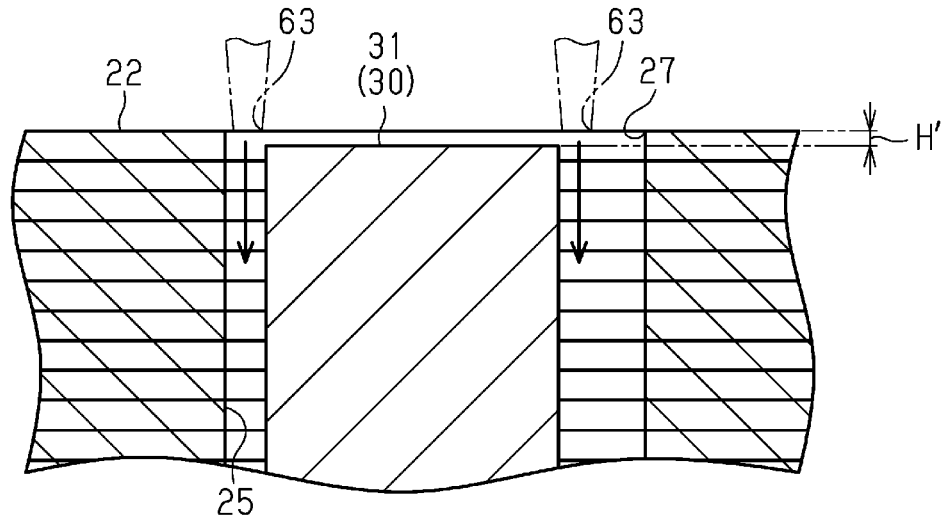
FIG. 10 is a cross-sectional view taken along line 10-10 of FIG. 9.

As shown in FIG. 10, when the distance H' in the axial direction between the second end face 22 and the end face 31 of the magnet 30 is less than 0.29 mm, one gate passage 63 is provided at each of the opposite ends in the lengthwise direction of the second opening 27.

Figure 6:
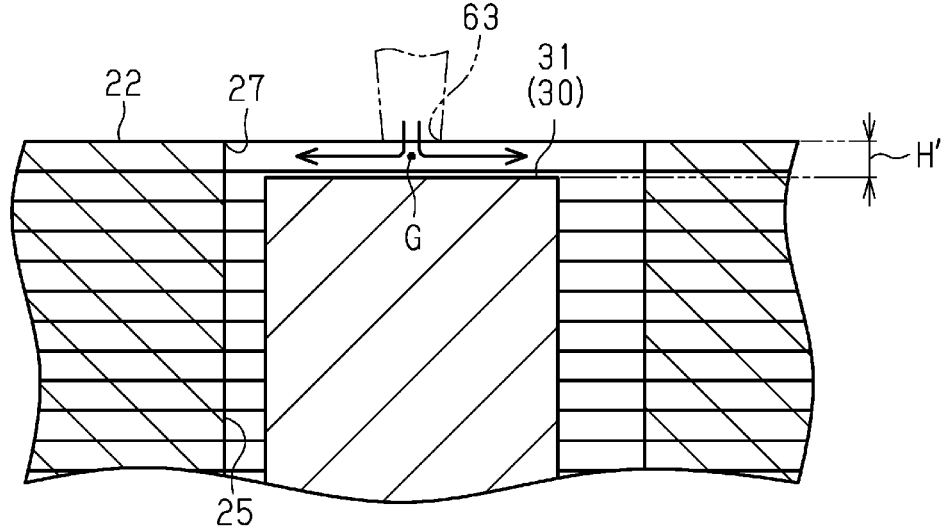
FIG. 6 is a cross-sectional view taken along line 6-6 of FIG. 5.

As shown in FIG. 6, if the distance H' is greater than or equal to 0.29 mm, the gate passage 63 is provided at a center portion in the lengthwise direction of the second opening 27.

The embodiments have the following advantages.

(1) To manufacture the rotor 10, the plastic of the plastic portions 40 is injected into the housing holes 25 through the gate passages 63 of the second die 60, which is arranged adjacent to the second end face 22 of the rotor core 20, and the second openings 27 of the housing holes 25. After the plastic of the plastic portions 40 hardens, the second die 60 is removed from the rotor 10 to separate the plastic gate portions formed in the gate passages 63 from the rotor 10. This forms the gate marks 42 in the end faces 41 of the plastic portions 40 exposed from the second openings 27 of the housing holes 25. The gate marks 42 are traces created when the plastic gate portions are separated.

If the quotient S1/S2, obtained by dividing the area S1 of the end face 41 of each plastic portion 40 by the area S2 of the corresponding gate mark(s) 42, is less than 24, the cross-sectional area S2' (S2'≈S2) of the plastic gate portion (s), or in other words, the gate passage(s) 63, is larger than the area S1' of the second opening 27 of the housing hole 25. Therefore, the flowability of the plastic of the plastic portion 40 in the gate passage(s) 63 is improved to enhance the fillability of the plastic into the housing hole 25. However, the separability of the plastic gate portion(s) deteriorates. This necessitates a separate cutter for cutting the plastic gate portions.

Also, when the quotient S1/S2 is greater than 150, the cross-sectional area S2' of the gate passage(s) 63 is smaller than the area S1' of the second opening 27 of the housing hole 25. Thus, although the separability of the plastic gate portion(s) is improved, the flowability of the plastic of the plastic portion 40 in the gate passage(s) 63 is lowered. This deteriorates the fillability of the plastic of the plastic portion 40 into the housing hole 25. As a result, there arises a disadvantage that a plastic containing a filler cannot be used.

With the above-described configuration, the quotient S1/S2 is in the range of 24 to 150. This improves both the fillability of the plastic of the plastic portions 40 into the housing holes 25 and the separability of the plastic gate portions.

(2) When the distance H is greater than or equal to 0.28 mm, the distance H' at the time of filling the housing hole 25 with the plastic is greater than or equal to 0.29 mm, taking into consideration sink marks after hardening of the plastic.

In a case in which the plastic of the plastic portion 40 is a liquid-crystal polymer, the filler may be added, for example, to increase the rigidity. In this case, as compared to a case in which no filler is added, the flowability of the plastic of the plastic portion 40 in a molten state is reduced. Therefore, if the distance H' when the plastic is injected into the housing hole 25 is less than 0.29 mm, the following drawbacks may be caused. If the gate passage 63 is provided at the center portion in the lengthwise direction of the second opening 27, a gap G between the gate passage 63 and the end face 31 of the magnet 30 is small, increasing the pressure loss of the plastic that has flowed into the gap G from the gate passage 63. This deteriorates the fillability of the plastic of the plastic portions 40 into the housing hole 25.

In this regard, in the rotor 10 according to the second embodiment, the distance H is less than 0.28 mm, and one gate mark 42 is formed at each of the opposite ends in the lengthwise direction of the second opening 27 in the end face 41 of the plastic portion 40. That is, the distance H' is less than 0.29 mm when plastic is injected into the housing hole 25, and at least one gate passage 63 is provided at each end in the lengthwise direction of the second opening 27. This allows the plastic of the plastic portion 40 to flow directly into the space between the inner circumferential surface of the housing hole 25 and the magnet 30 from the gate passages 63. As a result, the fillability of the plastic into the housing hole 25 is prevented from deteriorating.

(3) The distance H is greater than or equal to 0.28 mm, the single gate mark 42 is formed at the center portion in the lengthwise direction of the second opening 27 in the end face 41 of the plastic portion 40. That is, the distance H' at the time of filling the housing hole 25 with the plastic is greater than or equal to 0.29 mm, and the gate passage 63 is provided at the center portion in the lengthwise direction of the second opening 27. Therefore, even if the plastic of the plastic portion 40 flows into the gap G between the gate passage 63 and the end face 31 of the magnet 30 from the gate passage 63, the plastic smoothly moves toward the opposite ends in the lengthwise direction of the second opening 27 along the end face 31. This allows the number of gate passages 63 to be reduced. Accordingly, the configuration of the apparatus for manufacturing the rotor 10 is simplified.

(4) The area S1' of the second opening 27 and the cross-sectional area S2' of the gate passage(s) 63 are set such that the quotient S1'/S2', obtained by dividing the area S1' of the second opening 27 by the cross-sectional area S2', of the gate passage(s) 63 is in the range of 24 to 150.

This method achieves an advantage similar to the above-described operational advantage (1).

(5) If the distance H' is less than 0.29 mm, at least one gate passage 63 is provided at each end in the lengthwise direction of the second opening 27. In contrast, if the distance H' is greater than or equal to 0.29 mm, the gate passage 63 is provided at the center portion in the lengthwise direction of the second opening 27.

With this configuration, if the distance H' is less than 0.29 mm, at least one gate passage 63 is provided at each end in the lengthwise direction of the second opening 27. This allows the plastic of the plastic portion 40 to flow directly into the space between the inner circumferential surface of the housing hole 25 and the magnet 30 from the gate passages 63. As a result, the fillability of the plastic into the housing hole 25 is prevented from deteriorating.

In contrast, if the distance H' is greater than or equal to 0.29 mm, the gate passage 63 is provided at the center portion in the lengthwise direction of the second opening 27. Therefore, even if the plastic of the plastic portion 40 flows into the gap G between the gate passage 63 and the end face 31 of the magnet 30 from the gate passage 63, the plastic smoothly moves toward the opposite ends in the lengthwise direction of the second opening 27 along the end face 31. This allows the number of gate passages 63 to be reduced. Accordingly, the configuration of the apparatus for manufacturing the rotor 10 is simplified.

MODIFICATIONS

The above-described embodiments may be modified as follows. The above-described embodiments and the following modifications can be combined as long as the combined modifications remain technically consistent with each other.

The shape of each gate mark 42 in a plan view, that is, the cross-sectional shape of each gate passage 63 is not limited to a rectangular shape and may be changed to a circle or an ellipse.

The filler contained in the plastic of the plastic portions 40 is not limited to glass fibers, but may be changed to talc, glass beads, or the like.

In the rotor 10 according to the second embodiment, two or more gate marks 42 may be provided at one or both ends of the end face 41 of each plastic portion 40 in the lengthwise direction of the second opening 27.

In the above-described embodiments, the cold runner type runner plate 62 is used. However, a hot runner type runner plate may be used.

The plastic of the plastic portions 40 is not limited to a thermoplastic, but may be a thermosetting plastic. Even in this case, it suffices if the area S1' of each second opening 27 and the cross-sectional area S2' of the corresponding gate passage(s) 63 are set such that a quotient S1'/S2', obtained by dividing the area S1' by the cross-sectional area S2', is in the range of 24 to 150. This improves both the fillability of the plastic of the plastic portions 40 into the housing holes 25 and the separability of the plastic gate portions.

If the quotient S1/S2, obtained by dividing the area S1 of the end face 41 of each plastic portion 40 by the area S2 of the corresponding gate mark(s) 42, is in the range of 24 to 150, it is possible to improve both the fillability of the plastic of the plastic portion 40 into the housing hole 25 and the separability of the plastic gate portion(s).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A rotor, comprising:
   a rotor core including multiple housing holes;
   multiple magnets accommodated in the housing holes; and
   multiple plastic portions, each plastic portion being formed by plastic that fills corresponding one of the housing holes and fixes the corresponding magnet to the rotor core, wherein
   each plastic portion includes an end face exposed from an opening of the corresponding housing hole,
   a gate mark is formed on the end face of each plastic portion, the gate mark being a trace created when a plastic gate portion formed in a gate passage of a plastic filling device is separated during a process of filling the housing hole with the plastic through the gate passage, and
   a quotient obtained by dividing an area of the end face of each plastic portion by an area of the gate mark is in a range of 24 to 150.

2. The rotor according to claim 1, wherein
   the plastic includes a base plastic made of a liquid-crystal polymer base plastic, and a filler,
   each opening is elongate,
   a distance in an axial direction of the rotor core between each magnet and an end face of the rotor core on a side on which the openings are located is less than 0.28 mm,

the gate mark formed on the end face of each plastic portions is one of multiple gate marks, and at least one of the gate marks on the end face of each plastic portion is formed at each of opposite ends in a lengthwise direction of the opening in the end face.

3. The rotor according to claim 1, wherein the plastic includes a base plastic made of a liquid-crystal polymer base plastic, and a filler, each opening is elongate, a distance in an axial direction of the rotor core between each magnet and an end face of the rotor core on a side on which the openings are located is greater than or equal to 0.28 mm, and the gate mark on the end face of each plastic portion is formed at a center portion in a lengthwise direction of the opening in the end face.

4. A method for manufacturing a rotor, the rotor including a rotor core including multiple housing holes;

multiple magnets accommodated in the housing holes; and multiple plastic portions, each plastic portion being formed by plastic that fills corresponding one of the housing holes and fixes the corresponding magnet to the rotor core, wherein the method for manufacturing the rotor comprises:

filling each housing hole with the plastic through a gate passage of a plastic filling device and openings of the housing holes, the plastic filling device being arranged adjacent to an end face of the rotor core; and setting an area of each opening and a cross-sectional area of the gate passage such that a quotient obtained by dividing the area of the opening by the cross-sectional area of the gate passage is in a range of 24 to 150.

5. The method for manufacturing the rotor according to claim 4, wherein the plastic includes a base plastic made of a liquid-crystal polymer base plastic, and a filler, each opening is elongate, the method comprises:

when a distance in an axial direction of the rotor core between each magnet and an end face of the rotor core on a side on which the openings are located is less than 0.29 mm, providing the gate passage at each of opposite ends in a lengthwise direction of each opening; and when the distance is greater than or equal to 0.29 mm, providing the gate passage at a center portion in the lengthwise direction of each opening.

* * * * *